United States Patent [19]
Bergh et al.

[11] Patent Number: 5,602,642
[45] Date of Patent: Feb. 11, 1997

[54] MAGNETICALLY INSENSITIVE FIBER OPTIC ROTATION SENSOR

[75] Inventors: Ralph A. Bergh, Phoenix; Bogdan Szafraniec, Cave Creek, both of Ariz.

[73] Assignee: Honeywell Inc., Minneapolis, Minn.

[21] Appl. No.: 484,800

[22] Filed: Jun. 7, 1995

[51] Int. Cl.$^6$ .................................................. G01C 19/72
[52] U.S. Cl. .......................................................... 356/350
[58] Field of Search ................................. 356/350, 345; 385/12, 14; 250/227.27

[56] References Cited

U.S. PATENT DOCUMENTS

| | | |
|---|---|---|
| 4,671,658 | 6/1987 | Shaw et al. . |
| 5,187,757 | 2/1993 | Ohno et al. ............................. 356/350 |
| 5,260,768 | 11/1993 | Coadova et al. ....................... 356/350 |
| 5,333,214 | 7/1994 | Huang et al. . |
| 5,469,257 | 11/1995 | Blake et al. ............................ 356/350 |

*Primary Examiner*—Samuel A. Turner
*Attorney, Agent, or Firm*—John G. Shudy, Jr.

[57] ABSTRACT

A fiber optic gyroscope having at least one forty-five degree splice connected to a polarization maintaining sensing coil. The splice is an alignment of forty-five or so degrees between a major axis of a state of polarization of light or an axis of birefringence at a port of a splitter/combiner, which may be an IOC or a coupler, and an axis of birefringence at an end of a fiber of a fiber optic coil loop. The gyroscope is rendered significantly more insensitive to ambient magnetic fields which cause non-rotation errors in the gyroscope's indication of rotation of its sensing loop or coil. The polarization amplitude errors of the present depolarized gyroscope are no greater than those of a similar but non-depolarized gyroscope. The present gyroscope may use an integrated optic circuit or an optical fiber coupler for splitting the light into two beams that counterpropagate in the sensing coil, for combining the beams when they exit the sensing coil. Two forty-five degree splices are placed at each end of the coil thereby resulting in depolarized light beams in the coil. The gyroscope may be either an open loop or a closed loop configuration.

20 Claims, 6 Drawing Sheets

MAGNETICALLY INSENSITIVE FIBER OPTIC ROTATION SENSOR

BACKGROUND OF THE INVENTION

The present invention concerns fiber optic rotation sensor systems having non-reciprocal phase shifts, and particularly, having such phase shifts caused by magneto-optic effects of ambient magnetic fields. More particularly, the invention concerns sensor systems that have configurations for effecting desensitization from the effects of the magnetic fields which cause the phase shifts.

Fiber optic gyroscopes are an attractive means with which to sense rotation of an object supporting such a gyroscope. Such gyroscopes can be made quite small and can be constructed to withstand considerable mechanical shock, temperature change, and other environmental extremes. Due to the absence of moving parts, they can be nearly maintenance free, and they have the potential of becoming economical in cost. They can also be sensitive to low rotation rates that can be a problem in other kinds of optical gyroscopes.

A fiber optic gyroscope has a coiled optical fiber wound on a core and about the axis thereof around which rotation is to be sensed. The optical fiber has typically a length of 100 to 2,000 meters, or so, and is part of a closed optical path in which an electromagnetic wave, or light wave, is introduced and split into a pair of such waves to propagate in opposite directions through the coil to both ultimately impinge on a photodetector. Rotation about the sensing axis of the core, or the coiled optical fiber, provides an effective optical path length increase in one propagation direction and an optical path length decrease in the other propagation direction for one of these waves. The opposite result occurs for rotation in the other direction. Such path length differences between the waves introduce a phase shift between these waves for either rotation direction, i.e., the well-known Sagnac effect. This gyroscope is known as the interferometric fiber optic gyro (IFOG). The use of a coiled optical fiber is desirable because the amount of phase difference shift due to rotation, and so the output signal, depends on the length of the entire optical path through the coil traversed by the two electromagnetic waves traveling in opposed direction, and so a large phase difference can be obtained in the long optical fiber but in the relatively small volume taken by it as a result of being coiled.

The output current from the photodetector system photodiode, in response to the opposite direction traveling electromagnetic waves impinging thereon after passing through the coiled optical fiber, follows a raised cosine function. That is, the output current depends on the cosine of the phase difference between these two waves. Since a cosine function is an even function, such an output function gives no indication as to the relative directions of the phase difference shift, and so no indication as to the direction of the rotation about the coil axis. In addition, the rate of change of a cosine function near zero phase is very small, and so such an output function provides very low sensitivity for low rotation rates.

Because of these unsatisfactory characteristics, the phase difference between the two opposite direction traveling electromagnetic waves is usually modulated by placing an optical phase modulator, or what is sometimes referred to as a bias modulator, in the optical path on one side of the coiled optical fiber. In order to achieve sensitive detection of rotation, the Sagnac interferometer is typically biased by a sinusoidal or square wave modulation of the differential phase between the counter-propagating beams within the interferometric loop. As a result, one of these opposite direction propagating waves passes through the modulator on the way into the coil while the other wave, traversing the coil in the opposite direction, passes through the modulator upon exiting the coil.

In addition, a phase-sensitive detector serving as part of a demodulator system is provided to receive a signal representing the photodetector output current. Both the phase modulator and the phase-sensitive detector can be operated by a signal generator at the so-called "proper" frequency to reduce or eliminate modulator induced amplitude modulation, but other waveform types of the same fundamental frequency can be used. Other frequencies can be used, and often are, to reduce the frequency to a more manageable value.

The resulting signal output of the phase-sensitive detector follows a sine function, i.e., the output signal depends on the sine of the phase difference between the two electromagnetic waves impinging on the photodiode, primarily the phase shift due to rotation about the axis of the coil in the absence of occurrence of other significant but unwanted phase shifts. A sine function is an odd function having its maximum rate of change at zero phase shift, and so changes algebraic sign on either side of zero phase shift. Hence, the phase-sensitive detector signal can provide an indication of which direction a rotation is occurring about the axis of the coil, and can provide the maximum rate of change of signal value as a function of the rotation rate near a zero rotation rate, i.e., the phase sensitive detector (lock-in amplifier) has its maximum sensitivity for phase shifts near zero so that its output signal is quite sensitive to low rotation rates. This is possible, of course, only if phase shifts due to other sources, that is, errors, are sufficiently small. In addition, this output signal in these circumstances is very close to being linear at relatively low rotation rates. Such characteristics for the output signal of the phase-sensitive detector are a substantial improvement over the characteristics of the output current of the photodetector without optical phase modulation.

An example of such a system from the prior art is shown in FIG. 1. The optical portion of the system contains several features along the optical paths to assure that this system is reciprocal, i.e., that substantially identical optical paths occur for each of the opposite direction propagating electromagnetic waves except for the specific introductions of non-reciprocal phase difference shifts, as will be described below. The coiled optical fiber forms a coil 10 about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

In addition, the optical fiber can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, either the high refractive index axis, i.e., the slower propagation axis, or the low index axis is chosen for propagating the electromagnetic waves depending on the other optical components in the system.

The electromagnetic waves which propagate in opposite directions through coil 10 are provided from an electromagnetic wave source, or light source 11, in FIG. 1. This source is typically a laser diode which provides electromagnetic waves, typically in the near-infrared part of the spectrum, with a typical wavelength of 830 nanometers (nm). Source 11 must have a short coherence length for emitted light to reduce the phase shift difference errors between these waves due to Rayleigh and Fresnel scattering at scattering sites in coil 10. Because of the optical Kerr effect in coil 10, different intensities in the two counter propagating waves can lead to different phase shifts therebetween. This situation can be overcome also by use of a short coherence length source for source 11 which leads to modal phase shift canceling.

Between laser diode 11 and fiber optic coil 10 there is shown an optical path arrangement in FIG. 1 formed by the extension of the ends of the optical fiber forming coil 10 to some optical coupling components which separate the overall optical path into several optical path portions. A portion of polarization-maintaining optical fiber is positioned against laser diode 11 at a point of optimum light emission therefrom, a point from which it extends to a first optical directional coupler 12.

Optical directional coupler 12 has light transmission media therein which extend between four ports, two on each end of that media, and which are shown on each end of coupler 12 in FIG. 1. One of these ports has the optical fiber extending from laser diode 11 positioned thereagainst. At the other port on the sense end of the optical directional coupler 12 there is shown a further optical fiber positioned thereagainst which extends to be positioned against a photodiode 13 which is electrically connected to a photodetection system 14.

Photodiode 13 detects electromagnetic waves, or light waves, impinging thereon from the portion of the optical fiber positioned thereagainst and provides a photo current in response to a signal component selection means 35. This photocurrent, as indicated above, in the case of two nearly coherent light waves impinging thereon, follows a cosine function in providing a photocurrent output which depends on the cosine of the phase difference between such a pair of substantially coherent light waves. This photovoltaic device will operate into a very low impedance to provide the photo current which is a linear function of the impinging radiation, and may typically be a p-i-n photodiode.

Optical directional coupler 12 has another optical fiber against a port at the other end thereof which extends to a polarizer 15. At the other port on that same side of coupler 12 there is a non-reflective termination arrangement 16, involving another portion of an optical fiber.

Optical directional coupler 12, in receiving electromagnetic waves, or light, at any port thereof, transmits such light so that approximately half thereof appears at each of the two ports of coupler 12 on the end thereof opposite that end having the incoming port. On the other hand, no such waves or light is transmitted to the port which is on the same end of coupler 12 as is the incoming light port.

Polarizer 15 is used because, even in a single spatial mode fiber, two polarization modes are possible in electromagnetic waves passing through the fiber. Thus, polarizer 15 is provided for the purpose of passing one of these polarization modes through the optical fiber, along the slow axis thereof as indicated above, while blocking the other. Polarizer 15, however, does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which the polarizer is placed. In this regard, the high birefringence in the optical fiber used again aids in reducing this resulting phase difference, as indicated above.

Polarizer 15 has a port on either end thereof with the electromagnetic wave transmission medium contained therein positioned therebetween. Positioned against the port on the end thereof opposite that connected to optical directional coupler 12 is another optical fiber portion which extends to a further optical bidirectional coupler 17 which has the same wave transmission properties as does coupler 12.

The port on the same end of coupler 17 from which a port is coupled to polarizer 15 again is connected to a non-reflective termination arrangement 18, using a further optical fiber portion. Considering the ports on the other end of coupler 17, one is connected to further optical components in the optical path portions extending thereto from one end of the optical fiber in coil 10. The other port in coupler 17 is directly coupled to the remaining end of optical fiber 10. Between coil 10 and coupler 17, on the side of coil 10 opposite the directly connected side thereof, is provided an optical phase modulator 19. Optical phase modulator 19 has two ports on either end of the transmission media contained therein shown on the opposite ends thereof in FIG. 1. The optical fiber from coil 10 is positioned against a port of modulator 19. The optical fiber extending from coupler 17 is positioned against the other port of modulator 19.

Optical modulator 19 is capable of receiving electrical signals to cause it to introduce a phase difference in electromagnetic waves transmitted therethrough by changing the index of refraction of the transmission medium, or transmission media, therein to thereby change the optical path length. Such electrical signals are supplied to modulator 19 by a bias modulation signal generator 20 providing a sinusoidal voltage output signal at a modulation frequency $f_g$ that is intended to be equal to $C_1 \sin(\omega_g t)$ where $\omega_g$ is the radian frequency equivalent of the modulation frequency $f_g$. Other suitable periodic waveforms could alternatively be used.

This completes the description of the optical portion of the system of FIG. 1 formed along the optical path followed by the electromagnetic waves, or light waves, emitted by source 11. Such electromagnetic waves are coupled from that source through the optical fiber portion to optical directional coupler 12. Some of such wave entering coupler 12 from source 11 is lost in non-reflecting terminating arrangement 16 coupled to a port on the opposite end thereof, but the rest of that wave is transmitted through polarizer 15 to optical directional coupler 17.

Coupler 17 serves as a beam-splitting apparatus in which electromagnetic waves entering the port thereof, received from polarizer 15, split approximately in half with one portion thereof passing out of each of the two ports on the opposite ends thereof. Out of one port on the opposite end of coupler 17 an electromagnetic wave passes through optical fiber coil 10, modulator 19, and back to coupler 17. There, a portion of this returning wave is lost in non-reflective arrangement 18 connected to the other port on the polarizer 15 connection end of coupler 17, but the rest of that wave passes through the other port of coupler 17 to polarizer 15 and to coupler 12 where a portion of it is transmitted to photodiode 13. The other part of the wave passed from polarizer 15 to coil 10 leaves the other port on the coil 10 end of coupler 17, passes through modulator 19, and optical fiber coil 10 to re-enter coupler 17 and, again, with a portion thereof following the same path as the other portion to finally impinge on photodiode 13.

As indicated above, photodiode 13 provides an output photocurrent $i_{PD13}$ proportional to the intensity of the two electromagnetic waves or light waves impinging thereon, and is therefore expected to follow the cosine of the phase difference between these two waves impinging on that diode as given by the following equation:

$$i_{PD_{13}} = \frac{I_0}{2} [1 + \cos(\phi_R + \phi_m \cos \omega_g t)]$$

This is because the current depends on the resulting optical intensity of the two substantially coherent waves incident on photodiode 13, an intensity which will vary from a peak value of $I_o$ to a smaller value depending on how much constructive or destructive interference occurs between the two waves. This interference of waves will change with rotation of the coiled optical fiber forming coil 10 about its axis as such rotation introduces a phase difference shift of $\phi_R$ between the waves. Further, there is an additional variable phase shift introduced in this photodiode output current by modulator 19 with an amplitude value of $\phi_m$ and which is intended to vary as $\cos(\omega_g t)$.

Optical phase modulator 19 is of the kind described above and is used in conjunction with a phase-sensitive detector as part of a demodulation system for converting the output signal of photodetection system 14, following a cosine function as indicated above, to a signal following a sine function. Following such a sine function provides in that output signal, as indicated above, information both as to the rate of rotation and the direction of that rotation about the axis of coil 10.

Thus, the output signal from photodetection system 14, including photodiode 13, is converted to a voltage and provided through an amplifier 21, where it is amplified and passed through a filter 22, to such a phase sensitive detector means 23. Photodetection system 14, amplifier 21, filter 22 and phase sensitive detector 23 constitute signal component selection means. Phase-sensitive detector 23, serving as part of a phase demodulation system, is a well known device. Such a phase-sensitive detector extracts the amplitude of the first harmonic of the filtered photodiode system output signal, or the fundamental frequency of modulation signal generator 20, to provide an indication of the relative phase of the electromagnetic waves impinging on photodiode 13. This information is provided by phase-sensitive detector 23 in an output signal following a sine function, that is, this output signal follows the sine of the phase difference between the two electromagnetic waves impinging on photodiode 13.

Bias modulator signal generator 20, in modulating the light in the optical path at the frequency $f_g$ described above, also leads to harmonic components being generated by the recombined electromagnetic waves in photodetection system 14. Filter 22 is a bandpass filter which is to pass the modulation frequency component of the output signal of photodetector 14, i.e., the first harmonic, after its amplification by amplifier 21.

In operation, the phase difference changes in the two opposite direction propagating electromagnetic waves passing through coil 10 in the optical path, because of rotation, will vary relatively slowly compared with the phase difference changes due to modulator 19. Any phase differences due to rotation, or the Sagnac effect, will merely shift the phase differences between the two electromagnetic waves. The amplitude scaling factor of the modulation frequency component of the output signal of photodetection system 14, appearing at the output of filter 22, is expected to be set by the sine of this phase difference modified further only by the factors of a) the amplitude value of the phase modulation of these waves due to modulator 19 and generator 20, and b) a constant representing the various gains through the system. Then, the periodic effects of this sinusoidal modulation due to generator 20 and modulator 19 in this signal component are expected to be removed by demodulation in the system containing phase-sensitive detector 23 leaving a demodulator system (detector) output signal depending on just the amplitude scaling factor thereof.

Thus, the voltage at the output of amplifier 21 will typically appear as:

$$v_{21\text{-}out} = k\{1 + \cos[\phi_R + \phi_m \cos(\omega_g t + \theta)]\}$$

The constant k represents the gains through the system to the output of amplifier 21. The symbol $\theta$ represents additional phase delay in the output signal of amplifier 21 with respect to the phase of the signal provided by generator 20. Some of this phase shift will be introduced in photodetection system 14, and some will be due from other sources such as a phase shift across modulator 19 between the phase of the signals supplied by generator 20 and the response of modulator 19 in having the index of refraction of the media therein, and/or its length, correspondingly change. The other symbols used in the preceding equation have the same meaning as they did in the first equation above.

The foregoing equation can be expanded in a Bessel series expansion to give the following:

$$\begin{aligned} v_{21\text{-}out} = &\ k[1 + J_0(\phi_m)\cos\phi_R - \\ &\ 2kJ_1(\phi_m)\sin\phi_R \cos(\omega_g t + \theta) - \\ &\ 2kJ_2(\phi_m)\cos\phi_R \cos 2(\omega_g t + \theta) + \\ &\ 2kJ_3(\phi_m)\sin\phi_R \cos 3(\omega_g t + \theta) + \\ &\ \sum_{n=2}^{\infty} [(-1)^n 2kJ_{2n}(\phi_m)\cos\phi_R \cos 2n(\omega t + \theta) + \\ &\ (-1)^n 2kJ_{2n+1}(\phi_m)\sin\phi_R \cos(2n+1)(\omega_g t + \theta)] \end{aligned}$$

This signal at the output of amplifier 21 is applied to the input of filter 22.

Filter 22, as indicated above, passes primarily the first harmonic from the last equation, i.e., the modulation frequency component. As a result, the output signal of filter 22 can be written as follows:

$$v_{22\text{-}out} = -2kJ_1(\phi_m) \sin\phi_R \cos(\omega_g t + \theta + \psi_1)$$

The further phase delay term appearing $\psi_1$ is the additional phase shift in the first harmonic term added as a result of passing through filter 22. This added phase shift is expected to be substantially constant and a known characteristic of filter 22.

The signal from filter 22 is then applied to phase-sensitive detector 23, as is the signal from bias modulator generator 20, the latter again intended to be equal to $C_1 \sin(\omega_g t)$ where $\omega_g$ is the radian frequency equivalent of the modulation frequency $f_g$. Assuming that a phase shift equal to $\theta + \psi_1$ can be added by phase-sensitive detector 23 to its output signal, the output of that detector with such a generator 20 output signal will then be the following:

$$v_{23\text{-}out} = k'J_1(\phi_m \sin\phi_R)$$

The constant k' accounts for the system gains through phase-sensitive detector 23.

As can be seen from this equation, the output of phase sensitive detector 23 depends on the amplitude $\emptyset_m$ supplied by bias modulator 19 as operated by bias modulation generator 20 can be used to set the value of the signal at the output of phase-sensitive detector 23 for a given rotation rate of coil 10 about its axis, i.e., set the scale factor for the gyroscope at least within a range of possible values therefor.

However, these expected results may not be achieved in the system of FIG. 1. One reason for failing to achieve the expected results is that bias modulation signal generator 20, in modulating the light in the optical path at frequency $f_g$ as described above through phase modulator 19, not only results in harmonic components being generated in photodetection system 14 by the recombined electromagnetic waves, but also directly supplies some harmonic components in the varying optical path phase because of nonlinearities occurring both in generator 20 and modulator 19.

That is, as a first possibility, the output signal supplied by modulation generator 20 at its output may contain not only a fundamental signal at frequency $f_g$, but also significant harmonics thereof. Even if a signal free of such harmonics could be provided, nonlinear component characteristics and hysteresis in phase modulator 19 can result in introducing such harmonics into the varying phase provided thereby in the optical path. Such harmonics can lead to significant rate bias errors in the output signal of the fiber optic gyroscope. Thus, there is desired an interferometric fiber optic gyroscope in which such errors due to the modulation system are reduced or eliminated.

A "proper" frequency is selected to be that frequency which results in the modulating of one of the waves 180 degrees out of phase with the modulation of the other. This modulation providing 180 degrees of phase difference between the two waves has the effect of eliminating modulator induced amplitude modulation of the resulting photodetector signal. The value of the "proper" frequency can be determined from the length of the optical fiber and the equivalent refractive index therefor.

The resulting signal output of the phase sensitive demodulator follows a sine function, i.e., the output signal depends on the sine of the phase difference between the two electromagnetic waves impinging on the photodiode, primarily the phase shift due to rotation about the axis of the coil. A sine function is an odd function having its maximum rate of change at zero, and so changes algebraic sign on either side of zero. Hence, the phase sensitive demodulator signal can provide both an indication of which direction a rotation is occurring about the axis of the coil, and can provide the maximum rate of change of signal value as a function of rotation rate near a zero rotation rate, i.e., has its maximum sensitivity near zero phase shifts, so that its output signal is quite sensitive to low rotation rates. This is possible, of course, only if phase shifts due to other sources, that is, errors, are made sufficiently small. In addition, this output signal in these circumstances is very close to being linear at relatively low rotation rates. Such characteristics for the output signal of the phase sensitive demodulator are a substantial improvement over the characteristics of the output current of the photodetector.

Nevertheless, the phase sensitive demodulator output, in following a sine function, results in an output that at rotation rates further from zero, is less and less linear. For rotation rates of an amplitude sufficient to be past one of the peaks of the sine function, the output response value because of being periodic will be ambiguous with respect to just which rotation rate is occurring. Thus, there is a strong desire to operate the gyroscope so that the output signal of the phase sensitive demodulator stays within the linear region near the zero rotation rate value.

This can be accomplished by adding a further phase modulator, or frequency shifter, near the coil in an optical path portion used by the opposite direction traveling electromagnetic waves propagating through the coiled optical fiber to reach the photodetector. This phase modulator, or frequency shifter, is operated in a feedback loop from the photodetector system, and provides sufficient negative feedback such that the phase modulator introduced phase change is just enough to cancel the phase shift difference between the opposite traveling direction electromagnetic waves resulting from a rotation about the axis of the coiled optical fiber. As a result, there will be little phase shift difference occurring at the photodetector except for transient rotation rate changes, and so little phase shift sensed by the phase sensitive demodulator. Thus, the output signal of this phase sensitive demodulator will always be near to, or at, zero. The signal from a generator connected to the phase sensitive demodulator for operating this additional phase modulator, through providing a signal directing the modulator to provide a particular phase shift sufficient to cancel the phase shift due to rotation, will thus contain within it or a related signal the information as to the magnitude and direction of the rotation rate.

Several forms for the output signal from the generator connected to the phase sensitive demodulator in the feedback loop have been suggested for operating this additional optical phase modulator. One common and good choice is to use a serrodyne generator which applies a sawtooth-like signal to the optical phase modulator. A sawtooth or sawtooth-like signal is chosen because it can be shown that a sawtooth signal provides what amounts to a pure frequency translation for the modulated electromagnetic waves, a single-sideband modulator. As a result, light passing through the phase modulator being operated with such a sawtooth signal will leave the modulator with its frequency translated by an amount equal to the frequency of the sawtooth signal. A sawtooth-like signal won't result in pure frequency translation, there instead will be added harmonics generated which can be kept small by providing very nearly a sawtooth waveform and by good design of the modulator.

Since the optical phase modulator so operated will be on one side of the coiled optical fiber, one of the electromagnetic waves will have its frequency translated upon entering the coil while the other will not have its frequency translated until it exits the coil. Hence, one wave traverses the loop having a higher frequency than the other (though both have the same frequency on reaching the photodetector) with the result that, for a fixed modulator (or serrodyne generator) frequency, one will have a phase shift with respect to the other at the photodetector in an amount set by the frequency of the sawtooth and the nature of the fiber of $2\pi\tau\Delta f$. Here, $\Delta f$ is the modulator or generator frequency, and $\tau$ is the transit time of the light waves through the coil. This phase shift will act to counter the phase shift between the light waves, caused by rotation, because of the negative feedback loop in which the modulator is provided. Thus, the frequency of the sawtooth, or sawtooth-like generator output signal will be an indication of the rotation rate, and the polarity of the sawtooth will indicate the direction of rotation.

SUMMARY OF THE INVENTION

One of the error sources in the fiber optic gyroscope is the non-reciprocal phase shift resulting from the magneto-optic (Faraday) effect. Typically, this error is reduced by using a metal magnetic shielding which makes gyroscope packaging more difficult and expensive than without it. In some applications, dual magnetic shielding has to be used in order to obtain the sufficient bias stability for certain requirements. With the present invention, the gyroscope is desensitized from effects of ambient magnetic fields and, therefore, eliminates needed magnetic shielding makes its design substantially easier.

The suppression of the magnetic sensitivity is accomplished by using two 45 degree splices along with a polarization maintaining (PM) sensing coil. The 45 degree splices of PM fiber convert the classical PM gyroscope, which primarily uses linearly polarized light, to a depolarized gyroscope wherein polarization of the depolarized light evolves rapidly while propagating through the PM coil. The polarization evolution is different at each wavelength of the broadband spectrum of the light source. The polarization evolution leads to the averaging of the Faraday effect. The averaging takes place at each wavelength since polarization evolves rapidly through left circular and right circular polarization states which experience opposite non-reciprocal phase shifts in the presence of a magnetic field. The additional averaging occurs among different wavelengths of light since light of various wavelengths takes different optical paths through the PM coil and, therefore, has a different non-reciprocal phase shift at the same coil locations throughout the coil.

The use of 45 degree splices within the PM coil may be viewed as a poor practice by those knowledgeable in the field of fiber optic gyroscopes. Typically, splices within the loop are carefully aligned to equal zero degrees in order to minimize polarization cross-coupling and polarization errors. However, it is shown below that the use of two 45 degree splices in conjunction with the PM coil, does not increase the polarization errors.

DESCRIPTION OF THE EMBODIMENTS

Figure 1:
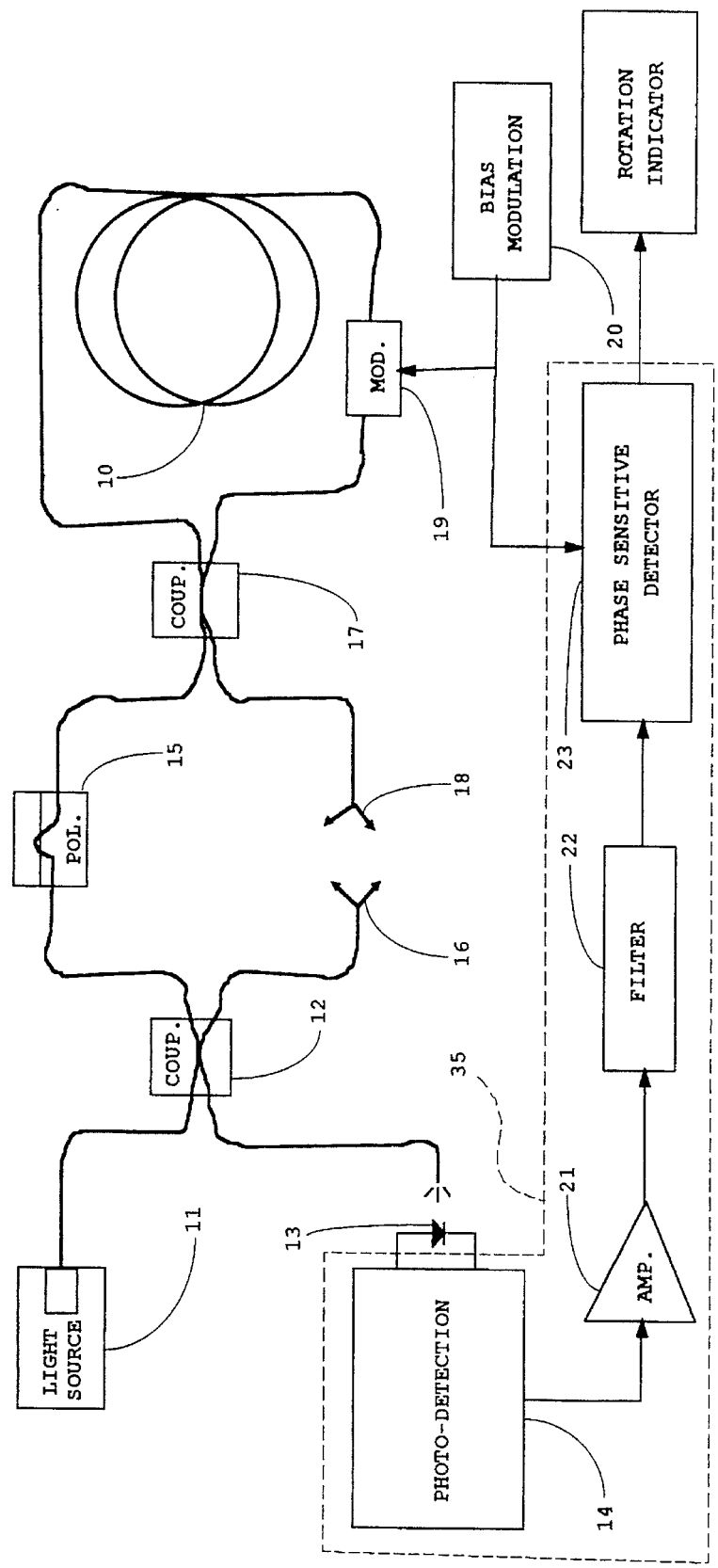
FIG. 1 is a diagram of a fiber optic gyroscope in the related art.
Figure 2:
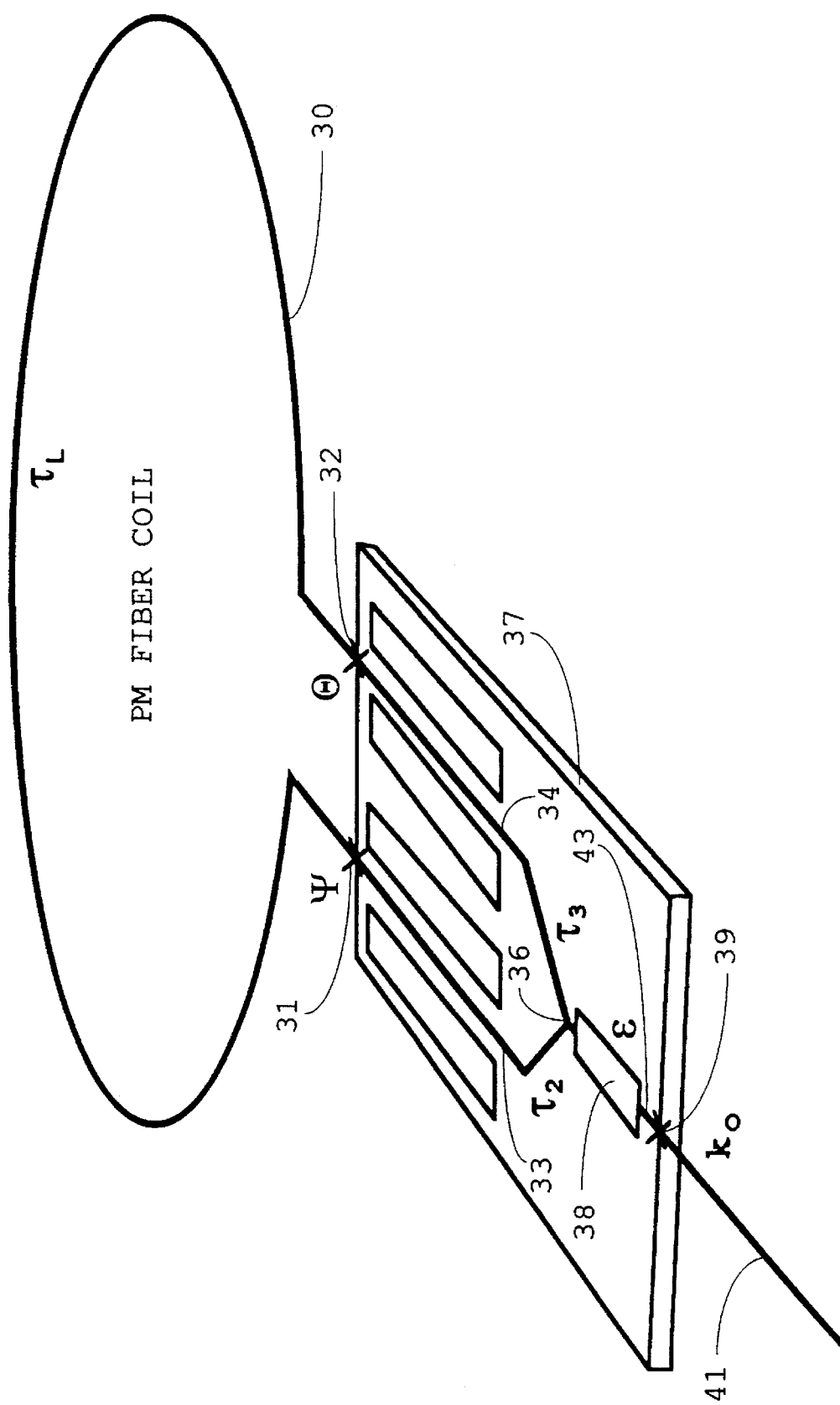
FIG. 2 illustrates the invention basics having forty-five degree splices and a polarization maintaining fiber optic coil.

FIG. 2 shows the PM fiber optic gyroscope having two arbitrary splices 31 and 32 within PM fiber loop or coil 30. The following analysis shows that the use of two 45 degree splices in lieu of zero degree splices does not increase polarization errors in the gyroscope. The three cases reviewed are where both splices 31 and 32 are aligned at zero degrees, where $\psi=0$ degrees and $\theta=0$ degrees, respectively; only one splice 31 or 32 is aligned at zero degrees and the other is aligned at 45 degrees, for instance, $\psi=45$ degrees and $\theta=0$ degrees; and both splices 31 and 32 are aligned at 45 degrees, that is, $\psi=45$ degrees and $\theta=45$ degrees, respectively.

$\tau_2$ is the birefringence induced delay between "Y" junction 36 on integrated optics circuit (IOC) 37 and splice 31. $\tau_3$ is the birefringence induced delay between Y junction 36 and splice 32. $\tau_L$ is the birefringence induced delay in PM fiber coil 30 between splices 31 and 32. s is the amplitude extinction delay of polarizer 38. $k_0$ is the cross-coupling point at splice 39 where fiber path 41 from the light source and to the detector of the fiber optic gyroscope system is connected to light guide 43 of IOC 37.

The amplitude polarization error comparisons are shown with the following analysis. The electric field at the detector is:

$$\begin{aligned} e &= \cos\psi\cos\theta & (1) \\ &-\sin\psi\sin\theta e^{jw\tau_L} & (2) \end{aligned} \Big\} \text{ primary waves}$$

$$\begin{aligned} &-\epsilon k_0 \sin\psi\cos\theta e^{jw\tau_2} & (3) \\ &-\epsilon k_0 \cos\psi\sin\theta e^{jw\tau_L+jw\tau_2} & (4) \\ &+ \ldots \end{aligned} \Big\} \text{ cross-coupled waves}$$

The interference of waves (1) & (3) and (2) & (4) results in the amplitude error for delay $\tau_2$ which is $$I_{amp}(\tau_2) = (2\epsilon k_0 \cos\psi \sin\psi \cos^2\theta - 2\epsilon k_0 \cos\psi \sin\psi \sin^2\theta)\Gamma(\tau_2) = \epsilon k_0 \cos 2\theta \sin 2\psi \Gamma(\tau_2);$$

and the amplitude error for delay $\tau_3$ which is $$I_{amp}(\tau_3) = \epsilon k_0 \sin 2\theta \cos 2\psi \Gamma(\tau_3),$$

where "$\Gamma$" is a degree of coherence.

From the above derived equations for amplitude polarization errors for $\tau_2$ and $\tau_3$, the errors for the three cases of splice 31 and 32 alignments $\psi$ and $\theta$, respectively, are determined. For the PM gyroscope, wherein $\psi=0$ degrees and $\theta=0$ degrees, the errors are, $2\epsilon k_0\Delta\Psi\Gamma(\tau_2)$ and $2\epsilon k_0\Delta\Theta\Gamma(\tau_3)$. For a depolarized gyroscope wherein $\psi=45$ degrees and $\theta=0$ degrees, the errors are $\epsilon k_0\Gamma(\tau_2)$ and $4k_0\Delta\Theta\Delta\Psi\Gamma(\tau_3)$. And for the depolarized gyroscope wherein $\psi=45$ degrees and $\theta=45$ degrees, the errors are $2\epsilon k_0\Delta\Theta\Gamma(\tau_2)$ and $2\epsilon k_0\Delta\Psi\Gamma(\tau_3)$. $\Delta\psi$ and $\Delta\theta$ represent the deviation in radians from 0 degrees or 45 degrees, for the 0 degree or 45 degree splices, respectively. Looking at the error results, one may note that a depolarized gyroscope having two 45 degree splices with a PM sensing coil, has no greater amplitude polarization errors than the PM gyroscope having two zero degree splices.

Figure 3:
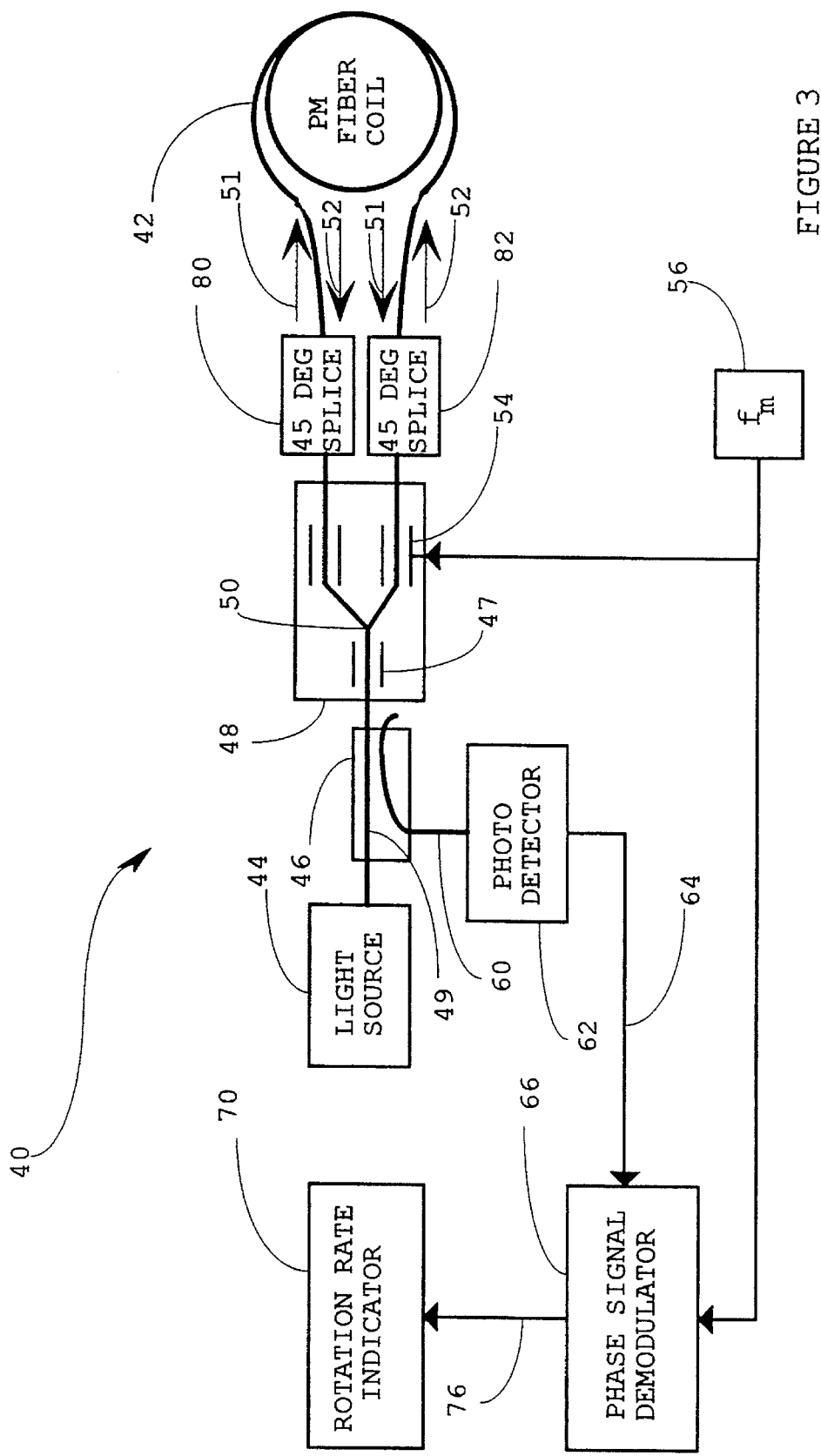
FIG. 3 is a schematic of an open loop fiber optic gyroscope utilizing an integrated optic circuit light beam splitter, and incorporating the invention.

FIG. 3 reveals an open loop interferometric fiber optic gyroscope 40 incorporating the invention for effecting desensitization from the effects of magnetic fields which cause a non-reciprocal phase shift resulting from a magneto-optic (Faraday) effect. Light source 44 emits light 49 on through splitter 46 and into integrated optic circuit (IOC) 48. Light beam 49 goes through polarizer 47, and is split into two beams 51 and 52 by "Y" junction 50. Output waveguides of IOC 50 are optically connected to 45 degree splices 80 and 82 which are connected to the ends of an optical fiber coil that constitutes sensing loop 42. The splice is an alignment of 45 degrees between a major axis of a state of polarization of light or an axis of birefringence at a port of splitter or IOC 48 or coupler 106, and an axis of birefringence at an end of fiber coil loop 42 or 104. Loop 42 is made of polarization maintaining optical fiber. Light beam 51 propagates clockwise through loop 42 and light beam 52 propagates counterclockwise through loop 42.

Modulator 54 in IOC 48 provides a bias phase modulation to beam 51 as it enters loop 42 and to beam 52 as it exits loop 42. The bias modulation signal originates from oscillator 56 that puts out the signal at a frequency $f_m$.

Beams 51 and 52 return to IOC 48 and are combined at Y junction 50 and pass through polarizer 47. Beams 51 and 52 enter splitter 46 wherein a portion of the beams go to fiber 60 which conveys beams 51 and 52 to photodetector 62 which converts the light beams in to electrical signals 64. If beams 51 and 52 are in phase, they result in a constructive interference that is converted into a maximum type of electrical signal 64 which indicates no rotation of loop 42 relative to an axis of loop 42 which may be identified with a straight line perpendicular to a plane containing loop 42. If loop 42 is rotating about it axis, then a relative phase shift between beams 51 and 52 occurs thereby resulting in less constructive interference because of beams 51 and 52 being no longer in phase with each other. The corresponding signal from photodetector 62 indicates a less maximum type of signal 64 indicating a rate of rotation of loop 42 about its axis. Beams 51 and 52 are phase modulated by modulator 54, and signal 64 has the modulation signal on it and is thus demodulated by demodulator 66 in conjunction with a signal having a frequency $f_m$ from oscillator 56, to result in a signal 68 which goes to rotation indicator 70 which provides a convenient and readily useful indication of rotation rate of loop 42.

When sensing loop 42 is at rest, beams 51 and 52 are in phase at the time they exit loop 42, are combined by Y junction 50, are split off onto fiber 60 and detected by photodetector 62 which sends signal 64 to demodulator 66. Rotation indicator 70 reveals loop 42 to be at rest, in accordance with the output from demodulator 66.

Beams 51 and 52, combined at Y junction 50 upon their return from loop 42 and split off on to fiber 60 and to be converted into electrical signal 64, go to demodulator 66 to be demodulated with respect to frequency $f_m$ into signal 76 for purposes of deciphering the phase relationship of beams 51 and 52 for determining the rate of rotation of loop 42.

Figure 4:
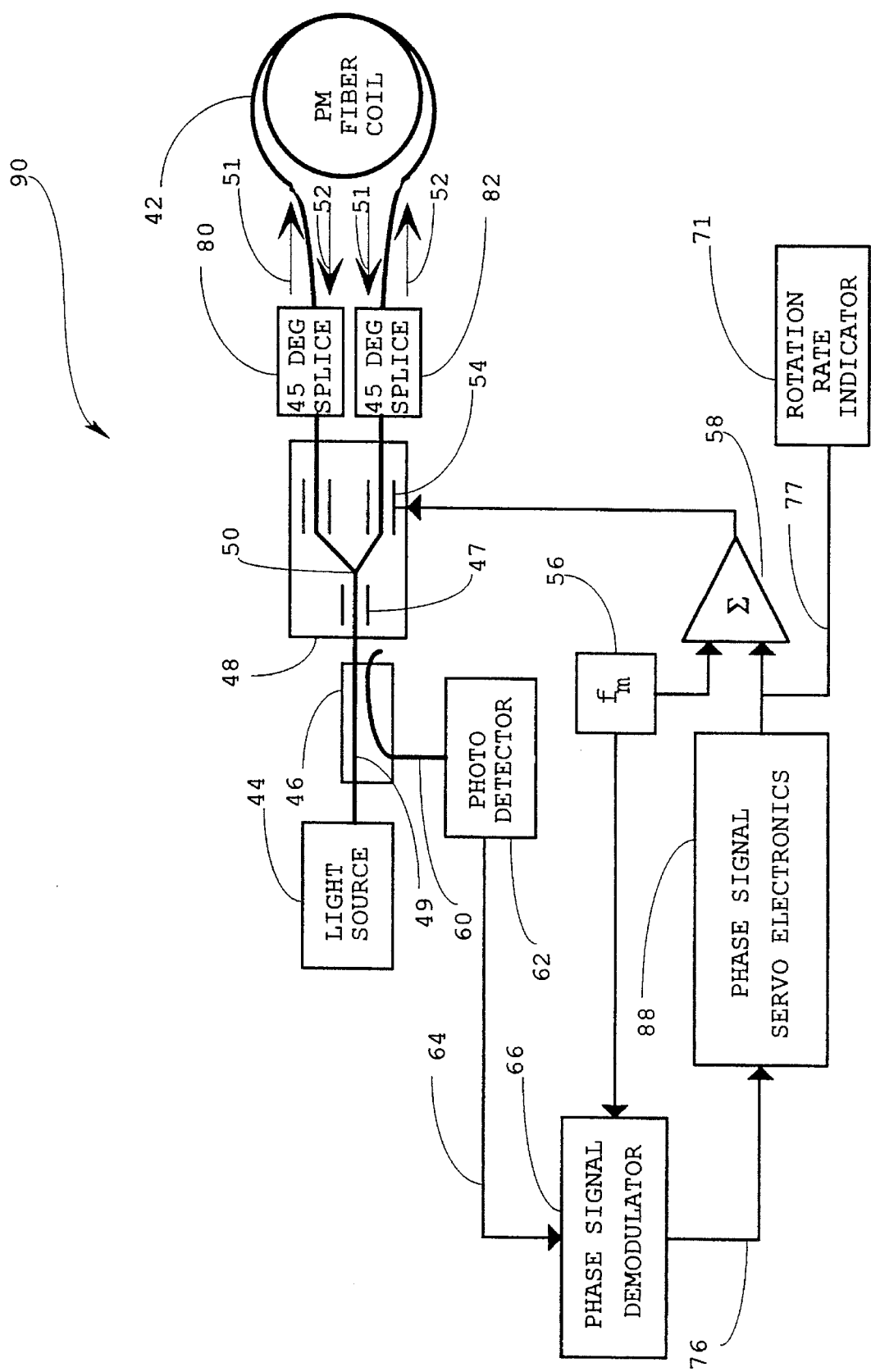
FIG. 4 is a schematic of a closed loop fiber optic gyroscope utilizing an integrated optic circuit light beam splitter, and incorporating the invention.

FIG. 4 illustrates configuration 90 of the fiber optic gyroscope incorporating the invention for effecting desensitization from the effects of magnetic fields which cause a no-reciprocal phase shift resulting from a magneto-optic (Faraday) effect. Beams 51 and 52 go through 45 degree splices 80 and 82, respectively, to counter-rotate in loop 42. Loop 42 consists of polarization maintaining optical fiber. The main distinction of configuration 90 from configuration 40 of FIG. 3 is that configuration 90 is a closed loop gyroscope and configuration 40 is an open loop gyroscope. A closed loop gyroscope 90 does not indicate the rate of rotation of sensing loop 42 from the phase difference between beams 51 and 52 incurred in loop 42. Instead, closed loop configuration 90 phase shifts one of the counterpropagating beams until both beams are in phase, in the case of a rotating sensing loop about its rotation sensitive axis. The amount of signal that is required to phase shift at least one of the beams to eliminate phase shift between the beams, is an indication of the rate of rotation of sensing loop 42.

Rather than to rotation rate indicator 70 of FIG. 3, the signal from demodulator 66 goes to a servo electronics 88 which is incorporated in FIG. 4. Servo electronics 88 receives signal 76 (i.e., signal 64 demodulated with respect to frequency $f_m$) which indicates an amount of phase difference between beams 51 and 52. In response to such phase difference, servo electronics 88 outputs a signal 77 that goes to phase modulator 54, via summing amplifier 58, to phase-shift beam 51 relative to beam 52 so as to bring the beams in phase with each other. The amount of signal 77 required to return beams 51 and 52 into phase, is an indication of the rate of rotation of sensing loop 42. Signal 77 also goes to rotation rate indicator 71 which provides a convenient and readily useful indication of rotation rate of loop 42.

The phase modulator used for bias phase modulation of the counterpropagating beams may also be used for bring in signal 77 to adjust the phase relationship of beams 51 and 52 to zero or to 180 degrees. Thus, signal 77 may be summed with the signal for bias phase modulation from oscillator or bias phase modulator driver 56 at summing amplifier 58.

Figure 5:
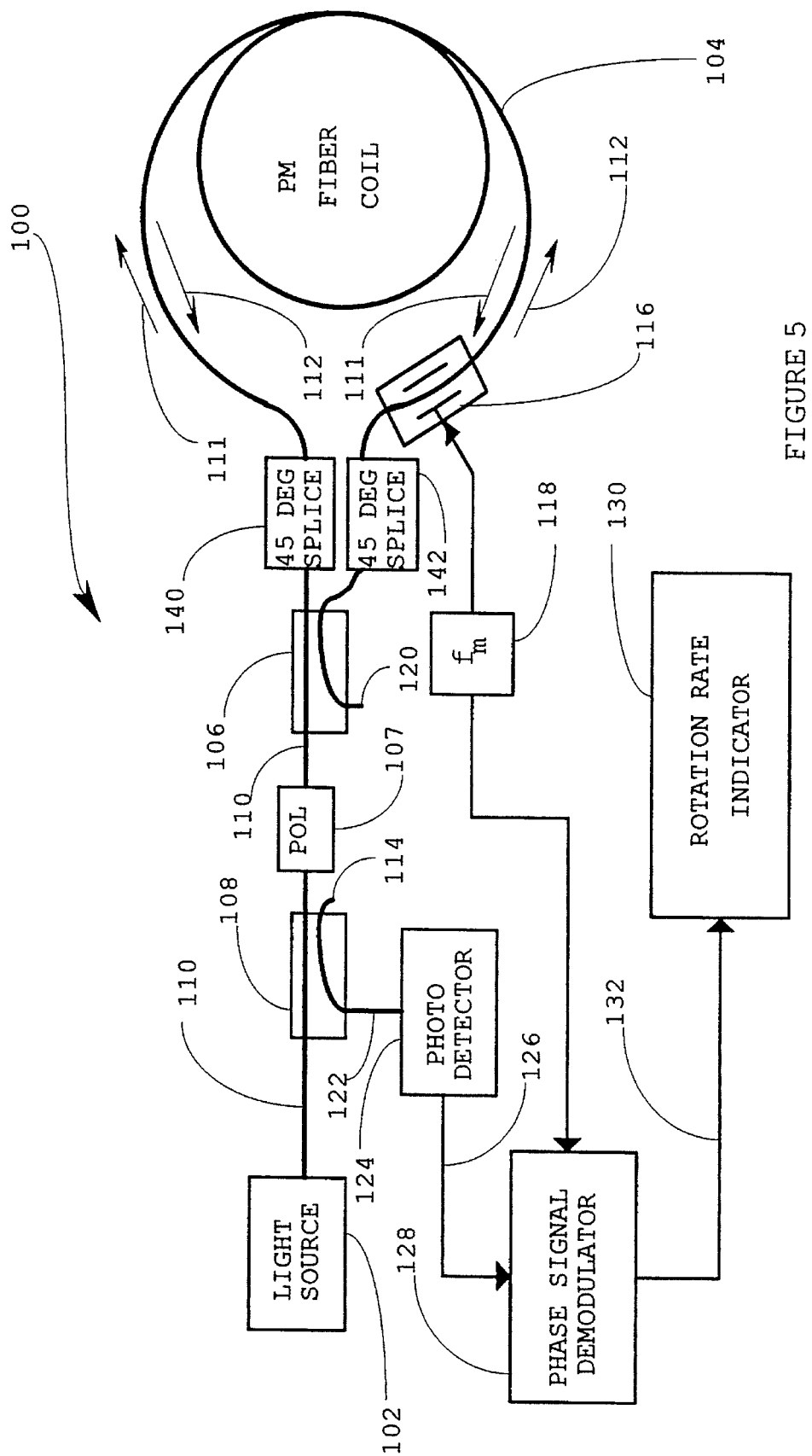
FIG. 5 is a schematic of an open loop fiber optic gyroscope utilizing an optical fiber light beam splitter, and incorporating the invention.

Configuration 100 of a fiber optic gyroscope in FIG. 5 has a coupler 106 instead of an integrated optical circuit such as circuit 48 of FIGS. 2 and 4, for a splitter to obtain counterrotating beams 111 and 112. Configuration 100 also incorporates the invention for effecting desensitization from the effects of magnetic fields which cause a no-reciprocal phase shift resulting from a magneto-optic (Faraday) effect. Broadband light source 102 emits a light beam 110 that goes through splitter 108, of which a portion of the light is lost in splitter 108 at a nonreflective termination 114. The remaining portion of beam 110 goes through polarizer 107 and into splitter 106 which splits beam 110 into beams 111 and 112. Beam 111 propagates through a 45 degree splice 140 and through loop 104 as beam 111 in a clockwise direction via polarization maintaining fiber. Beam 112 propagates through a 45 degree splice 142 and through loop 104 as beam 112 in a counterclockwise direction via polarization maintaining fiber. The splice is an alignment of 45 degrees between a major axis of a state of polarization of light or an axis of birefringence at a port of splitter or coupler 106, and an axis of birefringence at an end of fiber coil loop 104. Beam 112 is bias phase modulated as it enters loop 104 and beam 111 is bias phase modulated as it leaves loop 104. The bias phase modulation of beams 111 and 112 is effected by phase modulator 116 with a frequency $f_m$ from oscillator or modulator driver 118. Returning beams 111 and 112 enter splitter 106 and are respectively split and combined. One portion of the light split off from beams 111 and 112 is lost in splitter 106 at a nonreflective termination 120. The remainder of beams 111 and 112 pass through polarizer 107 and enter splitter 108 and a portion of the remainder of beams 111 and 112 enter fiber 122 which conveys such portion of beams 111 and 112 into photodetector 124. Photodetector 124 converts the light of beams 111 and 112 into a representative electrical signal 126 which goes to phase signal demodulator 128.

Beams 111 and 112 enter loop 104 in phase and counterpropagate the loop and exit the loop in phase provided that their optical paths have equal lengths in the loop. If there is a rotation of the loop about its axis which may be represented by a line that intersects the center of the loop and is perpendicular to a plane which encompasses the loop, the optical paths of beams 111 and 112 are different due to the Sagnac effect. If beams 111 and 112 are in phase, there is a constructive interference which results in a maximum type of light signal being presented to detector 124 which has corresponding electrical signal 126 indicating beams 111 and 112 to be in phase and, consequently, indicating the nonrotation of loop 104.

Demodulator 128 receives signal 126 and demodulates that signal with respect to frequency $f_m$ of a signal from oscillator or phase modulator 118. An output signal 132 of demodulator 128 goes to rotation rate indicator 130 which in usable form provides information as to apparent rotation of loop 104.

Electrical signal 126 carrying the characteristic of beams 111 and 112 goes through demodulator 128, which demodulates signal with respect to the phase modulation of the beams performed by phase modulator 116 at frequency $f_m$ in loop 104.

Figure 6:
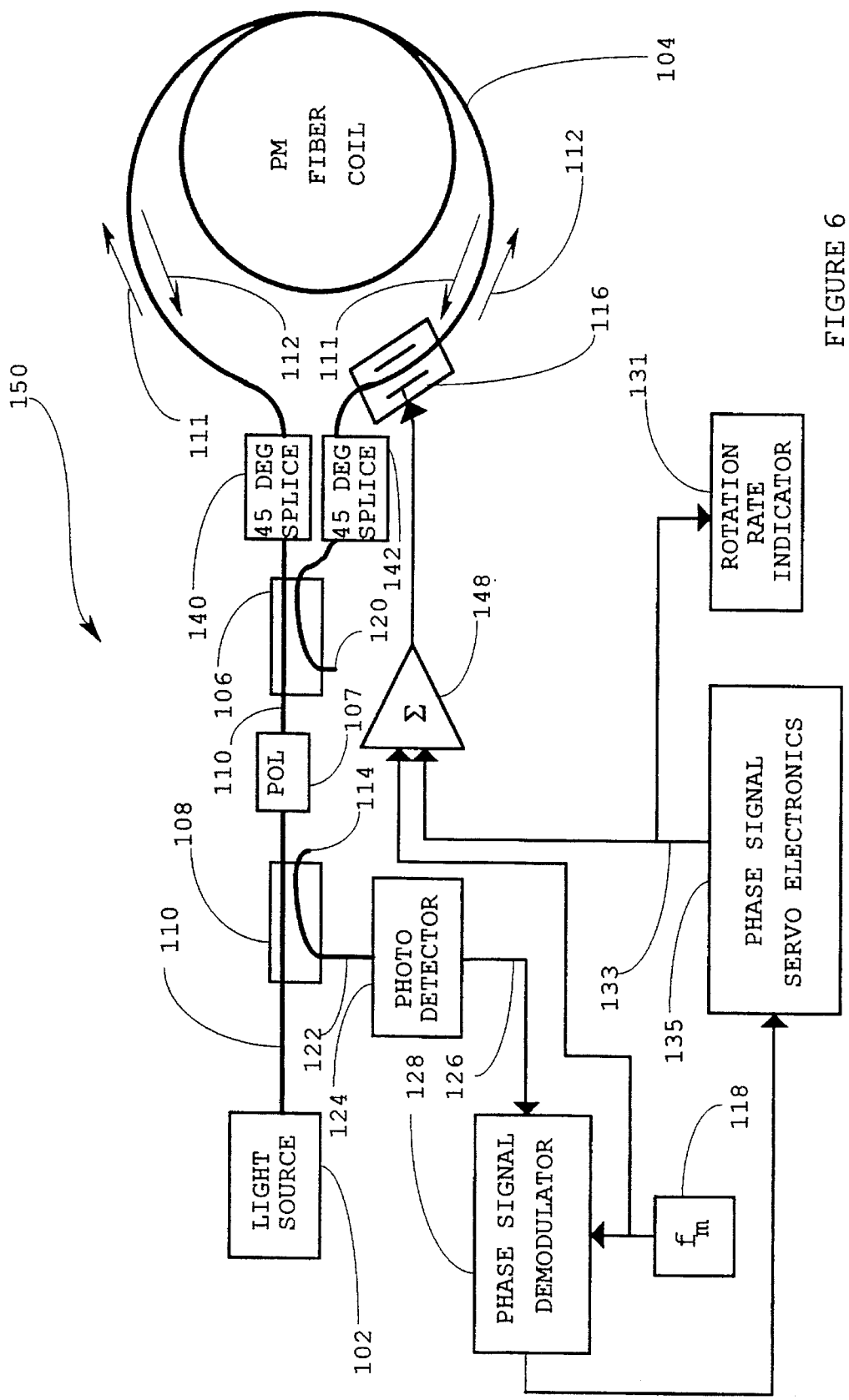
FIG. 6 is a schematic of a closed loop fiber optic gyroscope utilizing an optical fiber light beam splitter, and incorporating the invention.

FIG. 6 shows a closed loop fiber optic gyroscope 150 utilizing a optical fiber coupler 106 rather than an integrated optical circuit as a splitter of light beam 110 into beams 111 and 112. Configuration 150 incorporates the invention for effecting desensitization from the effects of magnetic fields which cause a non-reciprocal phase shift resulting from a magneto-optic (Faraday) effect.

Broadband light source 102 emits a light beam 110 that goes through splitter 108, of which a portion of the light is lost in splitter 108 at a nonreflective termination 114. The remaining portion of beam 110 goes through polarizer 107, and into splitter 106 which splits beam 110 into beams 111 and 112. Beam 111 propagates through a 45 degree splice 140 and through loop 104 in a clockwise direction via polarization maintaining fiber, as loop 104 is made from polarization maintaining optical fiber. Beam 112 propagates through a 45 degree splice 142 and through loop 104 in a counterclockwise direction via polarization maintaining fiber. Beam 112 is bias phase modulated as it enters loop 104 and beam 111 is bias phase modulated as it leaves loop 104. The bias phase modulation of beams 111 and 112 is effected by phase modulator 116 with a frequency $f_m$ from oscillator or modulator driver 118. Returning beams 111 and 112 enter splitter 106 and are respectively split and combined. One portion of the light split off from beams 111 and 112 is lost in splitter 106 at a nonreflective termination 120. The remainder of beams 111 and 112 pass through polarizer 107 and enter splitter 108; and a portion of the remainder of beams 111 and 112 enter fiber 122 which conveys such portion of beams 111 and 112 into photodetector 124. Photodetector 124 converts the light of beams 111 and 112 into a representative electrical signal 126 which goes to phase signal demodulator 128.

Beams 111 and 112 enter loop 104 in phase and counterpropagate the loop and exit the loop in phase provided that their optical paths have equal lengths in the loop. If there is a rotation of the loop about its axis which may be represented by a line that intersects the center of the loop and is perpendicular to a plane which encompasses the loop, the optical paths of beams 111 and 112 are different due to the Sagnac effect. If beams 111 and 112 are in phase, there is a constructive interference which results in a maximum type of light signal being presented to detector 124 which has corresponding electrical signal 126 indicating beams 111 and 112 to be in phase and, consequently, indicating the nonrotation of loop 104.

Demodulator 128 receives signal 126 and demodulates that signal with respect to frequency $f_m$ of a signal from oscillator or phase modulator 118. In FIG. 6, rather than to rotation rate indicator 130 of FIG. 5, the signal from demodulator 128 goes to a servo electronics 135. Servo electronics 135 receives signal 132 (i.e., signal 126 demodulated with respect to frequency $f_m$) which indicates an amount of phase difference between beams 111 and 112. In response to such phase difference, servo electronics 135 outputs a signal 133 that goes to phase modulator 116 to phase-shift beam 111 relative to beam 112 so as to bring the beams in phase with each other. The amount of signal 133 required to return beams 111 and 112 into phase, is an indication of the rate of rotation of sensing loop 104. Signal 133 also goes to rotation rate indicator 131 which provides a convenient and readily useful indication of rotation rate of loop 104.

Phase modulator 116 used for bias phase modulation of the counterpropagating beams may also be used for bring in signal 133 to adjust the phase relationship of beams 111 and 112 to zero. Thus, signal 133 may be summed with the signal for bias phase modulation from oscillator or bias phase modulator driver 118, at summing amplifier 148.

We claim:

1. An interferometric rotation sensor having a light source and a splitter/combiner having a first port connected to the light source and having second and third ports, comprising:

a sensing loop made of polarization maintaining optical fiber having first and second ends connected to the second and third ports of said splitter/combiner, respectively;

a first splice having an alignment, between 35 and 55 degrees, between a major axis of a state of polarization of light at the second port of said splitter/combiner and an axis of birefringence at the first end of said sensing loop; and a second splice having an alignment, between 35 and 55 degrees, between a major axis of a state of polarization of light at the third port of said splitter/combiner and an axis of birefringence at the second end of said sensing loop.

2. The rotation sensor of claim 1 further comprising:

a detector connected to said splitter/combiner;

a phase modulator proximate to said splitter/combiner;

a phase bias modulation frequency source connected to said phase modulator; and a phase signal demodulator connected to said detector and to said phase bias modulation frequency source.

3. The gyroscope of claim 2 wherein:

said light source emits a first beam of light;

said splitter/combiner receives and splits the first light beam into second and third light beams;

the second light beam is goes through said first splice;

the third light beam goes through said second splice;

the second light beam enters and propagates through said sensing coil;

the third light beam enters and propagates through said sensing coil;

the second and third light beams are phase bias modulated by said phase modulator at a frequency from said phase bias modulation frequency source;

the second and third light beams counter-rotate in said sensing loop;

said splitter/combiner combines the second and third light beams from said second and first splices, respectively, after exiting said sensing loop;

said detector receives the second and third light beams from said splitter/combiner, after counter-rotating in said sensing loop, and outputs a first electrical signal representing second and third light beams to said phase signal demodulator; and the first electrical signal is demodulated with respect to the frequency of said phase bias modulation frequency source, by said phase signal demodulator into a second electrical signal that indicates an amount of phase difference between the second and third light beams, the phase difference being caused by rotation of said fiber optic sensing loop.

4. The gyroscope of claim 3 further comprising phase signal servo electronics connected to said phase signal demodulator and to said phase modulator.

5. The gyroscope of claim 4 wherein:

said phase signal servo electronics receives and processes the second electrical signal into a third electrical signal that goes to said phase modulator to modulate the second light beam entering said sensing loop so as to cause the phase difference between the second and third beams to approach zero, the third electrical signal having a magnitude that is required to cause the phase difference to approach zero, and the magnitude of the third electrical signal being an indication of an amount of rotation rate of said sensing loop.

6. The rotation sensor of claim 1 wherein;

said first splice has an alignment of approximately 45 degrees; and said second splice has an alignment of approximately 45 degrees.

7. An interferometric sensor having a light source and a splitter/combiner connected to the light source, comprising:

a sensing loop having polarization maintaining optical fiber, connected to said splitter/combiner; and at least one splice, situated in said sensing loop, having an alignment between 35 and 55 degrees between an axis of birefringence of a first portion of the polarization maintaining optical fiber and an axis of birefringence of a second portion of the polarization maintaining optical fiber.

8. The interferometric sensor of claim 7 further comprising at least two splices, each splice having an alignment between 35 and 55 degrees, situated in said sensing loop.

9. The interferometric sensor of claim 8 wherein each splice has an alignment of approximately 45 degrees.

10. An interferometric fiber optic gyroscope comprising:

light source means for emitting a first light beam;

splitting means, proximate to said light source means, for splitting a first light beam into second and third light beams;

polarization maintaining optical fiber sensing loop means, connected to said splitting means, wherein the second light beam propagates through said polarization maintaining optical fiber sensing loop means in a first direction and the third light beam propagates in said polarization maintaining optical fiber sensing loop means in a second direction, such that the second and third light beams counter-rotate in said polarization maintaining optical fiber sensing loop means;

first splice means having an alignment, between 40 and 50 degrees between an axis of birefringence of a first portion of polarization maintaining optical fiber and an axis of birefringence of a second portion of polarization maintaining optical fiber, situated in said polarization maintaining optical fiber sensing loop means, for affecting second and third light beams; and second splice means having an alignment, between 40 and 50 degrees between an axis of birefringence of a first portion of polarization maintaining optical fiber and an axis of birefringence of a second portion of polarization maintaining optical fiber, situated in said polarization maintaining optical fiber sensing loop means, for affecting second and third light beams.

11. The interferometric fiber optic gyroscope of claim 10 further comprising:

modulation means, connected to said optical fiber sensing loop means, for phase modulating the second light beam prior to entering said polarization maintaining optical fiber sensing loop means and phase modulating the third light beam after exiting said polarization maintaining optical fiber sensing loop means, according to a phase bias frequency;

detection means, connected to said splitting means, for receiving at least portions of second and third light beams after exiting said polarization maintaining optical fiber sensing loop means; and phase signal demodulation means, connected to said detection means, for receiving electrical signals representing second and third light beams as detected by said detection means, and for demodulating the electrical signals into phase signals that represent phase differences which exist between second and third light beams, according to the phase bias frequency, wherein the phase differences between second and third light beams are indications of rotation of said polarization maintaining optical fiber sensing loop means.

12. The interferometric fiber optic gyroscope of claim 11 wherein said splitter/combiner is an optical fiber coupler.

13. The interferometric fiber optic gyroscope of claim 11 is an integrated optical circuit.

14. An interferometric fiber optic gyroscope comprising:

a light source for emitting a first light beam;

a splitter, proximate to said light source, for splitting first light beam into second and third light beams;

an optical fiber sensing loop, proximate to said splitter, wherein the second light beam propagates through said optical fiber sensing loop in a first direction and the third light beam propagates in said optical fiber sensing loop in a second direction, such that the second and third beams counter-rotate in said optical fiber sensing loop;

a modulator, connected to said optical fiber sensing loop, for phase modulating the second light beam when entering said optical fiber sensing loop, according to a frequency;

a detector, connected to said splitter, for receiving at least portions of second and third light beams after exiting said optical fiber sensing loop; and a phase signal demodulator, connected to said detector, for receiving electrical signals representing second and third light beams as detected by said detector, and for demodulating the electrical signals into phase signals that represent phase differences which exist between second and third light beams, according to the frequency, wherein the phase differences between second and third light beams are indications of rotation of said optical fiber sensing loop; and wherein the improvement comprises:

a first splice, having an alignment of approximately 45 degrees between a major axis of a state of polarization of light at a first port of said splitter and an axis of birefringence at a first end of said optical fiber sensing loop; and a second splice, having an alignment of approximately 45 degrees between a major axis of a state of polarization of light at a second port of said splitter and an axis of birefringence at a second end of said optical fiber sensing loop; and wherein said optical fiber sensing loop is a polarization maintaining optical fiber sensing loop.

15. A magnetically insensitive fiber optic gyroscope comprising:

a light source;

a splitter/combiner connected to said light source;

a sensing coil connected to said splitter/combiner;

a phase modulator situated between said splitter/combiner and said sensing coil; and a detector connected to said splitter/combiner; and wherein:

said gyroscope further comprises at least one splice having an alignment of approximately 45 degrees between a major axis of birefringence of a first portion of optical fiber of said sensing coil and an axis of birefringence of a second portion of optical fiber of said sensing coil; and said sensing coil comprises at least one polarization maintaining light path.

16. An interferometric sensor comprising:

a sensing loop having highly birefringent optical fiber and having first and second ends;

a first splice having an alignment between 40 and 50 degrees between a major axis of a state of polarization of light and an axis of birefringence proximate to the first end of said sensing loop; and a second splice having an alignment between 40 and 50 degrees between a major axis of a state of polarization of light and an axis of birefringence proximate to the second end of said sensing loop.

17. The interferometric sensor of claim 16 wherein:

said first splice has an alignment of about 45 degrees; and said second splice has alignment of about 45 degrees.

18. An interferometric fiber optic sensor having a light source and a splitter/combiner proximate to said source, comprising:

a sensing loop having highly birefringent optical fiber; and at least one nearly 45 degree splice between an axis of birefringence in a first portion of optical fiber and an axis of birefringence in a second portion of the optical fiber in said sensing loop.

19. An interferometric fiber optic sensor having a light source and a splitter/combiner proximate to said source, comprising:

a sensing loop having highly birefringent optical fiber; and at least one nearly 45 degree splice between a major axis of a state of polarization of light and an axis of birefringence within said splitter/combiner.

20. An interferometric rotation sensor having a light source and a splitter/combiner having a first port connected to the light source and having second and third ports, comprising:

a sensing loop made of polarization maintaining optical fiber having first and second ends connected to the second and third ports of said splitter/combiner, respectively;

a first splice having an alignment, between 35 and 55 degrees, between an axis of birefringence at the second port of said splitter/combiner and an axis of birefringence at the first end of said sensing loop; and a second splice having an alignment, between 35 and 55 degrees, between an axis of birefringence at the third port of said splitter/combiner and an axis of birefringence at the second end of said sensing loop.

* * * * *